United States Patent [19]
Witters et al.

[11] Patent Number: 6,072,989
[45] Date of Patent: Jun. 6, 2000

[54] METHOD TO DETERMINE A SCHEDULED RATE VALUE TO BE USED IN A POLICING ALGORITHM, AND RELATED POLICING DEVICE

[75] Inventors: Johan Hilda Witters, Essen, Belgium; Edouard Metz, Sneck, Netherlands

[73] Assignee: Alcatel, Paris, France

[21] Appl. No.: 08/956,894

[22] Filed: Oct. 23, 1997

[30] Foreign Application Priority Data

Oct. 23, 1996 [EP] European Pat. Off. ............. 96402253

[51] Int. Cl.$^7$ ...................................................... H04Q 7/20
[52] U.S. Cl. .......................................... 455/67.1; 455/423
[58] Field of Search ................................... 455/5.1, 67.1, 455/426, 423; 370/230, 231, 232

[56] References Cited

U.S. PATENT DOCUMENTS

| | | | |
|---|---|---|---|
| 5,377,327 | 12/1994 | Jain et al. | 395/200 |
| 5,546,377 | 8/1996 | Ozveren | 370/13 |
| 5,784,358 | 7/1998 | Smith et al. | 370/230 |
| 5,889,761 | 3/1999 | Yamato | 370/231 |

FOREIGN PATENT DOCUMENTS

| | | |
|---|---|---|
| 0487235 | 5/1992 | European Pat. Off. . |
| 0647081 | 4/1995 | European Pat. Off. . |

OTHER PUBLICATIONS

IEEE Network: The Magazine of Computer Communications, vol. 9, No. 2, Mar. 1, 1995. Bonomi F. et al, "The Rate–Based Flow Control Framework for the Available Bit Rate Service".

BT Technology Journal, vol. 13, No. 3, Jul. 1995, pp. 67–79, Adams J.L. et al "The Support of the Available Bit Rate Bearer Capability Using Virtual Source/Destination Concepts".

"Proposed Text on Conformance Definition for the ABR Service" from the Contribution to the ITU Standard 2.371 with reference No. D.1104. pp. 1–6.

Section 5.10.4 on pp. 51—51 of the ATM Forum Traffic Management Specification Version 4 published in Feb. 1996, pp. 51—51.

"ABR: Realizing the Promise of ATM", written by N. Richard and published in the magazine, 'Telecommunications;, vol. 29, No. 4, Apr. 1995.

*Primary Examiner*—Daniel S. Hunter
*Assistant Examiner*—Myron K. Wyche
*Attorney, Agent, or Firm*—Ware, Fressola, Van Der Sluys & Adolphson LLP

[57] ABSTRACT

In a connection between an origin node (S, VS1) and a destination node (D, VD2), data traffic is policed by a policing device (POL) so that traffic descriptors in a traffic contract between subscriber and network provider and rules specified in standards have to be respected by the origin node (S, VS1), unless data will be discarded by the policer (POL). To control its cell transmit rate, the origin node (S, VS1) regularly transmits resource management cells (FRM) which are returned by nodes along the path to the destination (D, VD2). Once reflected, the resource management cells (FRM) become backward resource management cells (BRM). Each time such a backward resource management cell (BRM) passes the policing device (POL), the policer determines a scheduled rate value (R_first, R_last) and associated scheduled time value (T_first, T_last) and memorises both values in a list of scheduled rate values. The information in this list is used by the policer (POL) any time the actual policing rate (APR) has to be determined. To determine a scheduled rate value (R_first, R_last) at arrival of a backward resource management cell (BRM), the policer (POL) according to the present invention, also uses information deduced from a forward resource management cell (FRM).

8 Claims, 9 Drawing Sheets

METHOD TO DETERMINE A SCHEDULED RATE VALUE TO BE USED IN A POLICING ALGORITHM, AND RELATED POLICING DEVICE

TECHNICAL FIELD

The present invention relates to a method to determine in a policing device a scheduled rate to be used at an associated scheduled time on the policing device to police cell traffic in a connection between an origin node and a destination node of a cell switching network, wherein a cell transmit rate of the origin node is controlled by the origin node upon receipt and interpretation of rate control information contained in a backward resource management cell that is backward routed via the policing device towards the origin node, wherein the method calculates the schedule rate value from the rate control information in the backward resource management cell.

It is also directed to a policing method and a policing device for controlling cell traffic in a connection between an origin node and a destination node of a cell switching network.

BACKGROUND OF THE INVENTION

Such a method to determine a scheduled rate value, such a policing method and such a policing device are already known in the art, e.g. from the *Contribution to the ITU Standard I.371* with reference number D.1104. This contribution is entitled *'Proposed Text on Conformance Definition for the ABR Service'* and is filed in the name of United States of America. In the annex from page 3 to page 6 of this document, a sample algorithm for policing ABR (Available Bit Rate) connections is described. In such ABR connections, the origin node, i.e. a source or virtual source node, regularly sends so called resource management (RM) cells in between the ATM (Asynchronous Transfer Mode) cells that contain data. These RM cells are interpreted by and their contents may be modified by network nodes, virtual destination nodes and/or destination nodes. Each resource management cell becomes reflected by a network or destination node to be returned to the origin node whereby it was sent. Thus, forward resource management cells (FRM) generated by an origin node become backward resource management cells (BRM) once they are reflected by a network or destination node. Based on the contents of the so received backward RM cells and rules defined in the section 5.10.4 on pages 51–52 of the *ATM Forum Traffic Management Specification Version 4*, published in February 1996, the origin node is supposed to control its transmit rate. According to the ABR specifications, a traffic contract specifies negotiated parameters such as the peak cell rate (PCR), the minimum cell rate (MCR), . . . , and probably the conformance definition which the network provider and the subscriber mutually have to support on the connections covered by this contract. A policing device in the network determines whether or not the traffic descriptors of the traffic contract are met and thereto applies the DGCRA (Dynamic Generic Cell Rate Algorithm) suggested by the ATM Forum that works on ABR standardisation. The policing device thereto schedules rate values and associated time values. From the scheduled rate and time values, the policing device can determine the maximum acceptable cell transmit rate of an origin node at each instant, called the actual policing rate in the remainder of this document. The above mentioned *Contribution to the ITU Standard* contains, from page 3 (last two lines) to page 4, line 8, a software implementation of an algorithm that determines a scheduled rate value r(i). To determine this scheduled rate value r(i), rate control information CI(i), NI(i) ER(i) of a backward resource management cell with index i is used. According to source behaviour rule 5, defined on page 52 of the above cited *ATM Forum Traffic Management Specification*, the cell transmit rate of a source or virtual source has to be forced to the initial cell rate ICR specified in the traffic contract whenever this source or virtual source sends a new resource management cell while a certain time period has elapsed since the last forward resource management cell was sent by this source. Moreover, rule 6 on page 52 specifies that the cell transmit rate of a source or virtual source has to be decreased in proportion to a predetermined rate decrease factor RDF if at least a certain number, CRM, forward resource management cells are received by the policing device since the last backward resource management cell was sent from the policing device to this source or virtual source. In the method disclosed in the above mentioned contribution, an origin node can return at a high transmission rate after a period wherein its cell transmit rate is forced to decrease in accordance to rule 5 or rule 6. This is so because the scheduled rate r(i) is calculated solely on the basis of the contents of backward resource management cells. It is apparent to persons skilled in the art of network traffic management that this may lead to congestion somewhere in the network.

In addition, the known method suffers some minor disadvantages. The policing method disclosed in the earlier mentioned *Contribution to the ITU Standard* for instance does not check whether the congestion indication (CI) bit, a bit which indicates that the source transmit rate in an ABR connection has to be decreased, is set in backward resource management cells. As a result the known policing method does not realise the tightest policing conditions for ABR connections. The known method also does not test cell sequence integrity. Rule 3 on page 51 of the already cited *ATM Forum Traffic Management Specification*, specifies the minimum number of ATM data cells that has to be sent between two successive forward RM cells, and the conditions that have to be fulfilled for transmission of a backward RM cell from the policing device towards the source or virtual source. If the policing device does not check cell sequence integrity, forward resource management cells may be flooding the network or may be sent too infrequently. It is however to be noticed (see point 3 in the paragraph 5.10.6 entitled *'Switch behaviour'* on page 54 of the ATM Forum Specification) that cell sequence integrity may be violated for data cells if the network contains a switching node between the origin node and policing device. Yet another shortcoming of the known algorithm is that it does not check out-of-rate cell conformance. Cells marked as out-of-rate cells are subjected to rule 11 on page 52 of the already cited Specification. When the policing device does not check conformance of such cells, these out-of-rate cells may be flooding the network and cause congestion.

SUMMARY OF THE INVENTION

An object of the present invention is to provide a method to determine a scheduled rate value, a policing algorithm and a policing device of the above known type but which realise tighter conformance conditions and which consequently guarantee a better protection of network resources.

According to the invention, this object is achieved by a method to determine in a policing device a scheduled rate value to be used at an associated scheduled time on the policing device to police cell traffic in a connection between an origin node and a destination node of a cell switching network, wherein a cell transmit rate of the origin node is controlled by the origin node upon receipt and interpretation of rate control information contained in a backward resource management cell that is backward routed via the policing device towards the origin node, the method comprising the step of calculating the schedule rate value from the rate control information in the backward resource management cell, wherein for calculating the scheduled rate value information is also deduced from a forward resource management cell, the forward resource management cell being generated by the origin node and routed forward towards the destination node via the policing device.

It is also achieved by a policing method for cell traffic in a connection between an origin node and a destination node of a cell switching network, wherein a cell transmit rate of the origin node is controlled by the origin node upon receipt and interpretation of rate control information contained in a backward resource management cell backward routed via a policing device which executes the policing method towards the origin node, the policing method including the steps of determining a scheduled rate value and a related scheduled time value each time a backward resource management cell arrives at the policing device from rate control information in the backward resource management cell; memorising the scheduled rate value and related scheduled time value in a list of scheduled rate values; determining from information memorised in the list of scheduled rate values an actual policing rate; and checking conformance of each in-rate cell arriving at the policing device with respect to the actual policing rate (APR), wherein for calculating the scheduled rate value, information is also deduced from a forward resource management cell, the forward resource management cell being generated by the origin node and routed forward towards the destination node via the policing device.

Furthermore, this object is achieved by a policing device adapted to police cell traffic in a connection between an origin node and a destination node of a cell switching network wherein a cell transmit rate of the origin node is controlled by the origin node upon receipt and interpretation of rate control information contained in a backward resource management cell backward routed via a policing device which executes the policing method towards the origin node, the policing device including: scheduled rate determining means for determining a scheduled rate value and a related scheduled time value each time a backward resource management cell arrives at the policing device from rate control information in the backward resource management cell; memory means for storing the scheduled rate value and related scheduled time value in a list of scheduled rate values; calculating means for determining from information memorised in the list of scheduled rate values an actual policing rate; and policing means for checking conformance of each in-rate cell arriving at the policing device with respect to the actual policing rate, wherein the determining means also uses information deduced from a forward resource management cell to calculate the scheduled rate value, the forward resource management cell being generated by the origin node and routed forward towards the destination node via the policing device.

Indeed, at arrival of a forward resource management cell, the policing device decides to decrease the scheduled rate value proportional to the predetermined rate decrease factor RDF if already a certain number of forward resource management cells were received since the last backward RM cell arrived at the policing device. Furthermore, the scheduled rate value is forced to the initial cell rate if a certain time period has elapsed between the receipt of two forward resource management cells at the policing device. The actual policing rate used to check conformance of incoming cells is calculated from the scheduled rate values. Hence, this actual policing rate follows the above decreases and a source will no longer be allowed to return at an unacceptably high cell transmit rate after its rate was forced down.

An additional feature of the present method to determine a scheduled rate value is that a new rate value is scheduled each time a backward resource management cell arrives at the policing device. To determine the rate value to be scheduled, information deduced at arrival of the last forward resource management cell has to be considered. This may be realised for instance via the schedule rate parameter whose value is updated at arrival of a forward RM cell and used to determine the scheduled rate value at arrival of a backward RM cell.

A further feature of the method to determine a scheduled rate value is where the network resources are protected whenever the source transmit rate, according to rule 5 of the ABR Specification, is forced to the initial cell rate. This happens when no forward resource management cell is received for some time from this source. Sources which are silent for a certain time period are forbidden to return at rates higher than the initial cell rate.

Yet another feature of the method to determine a scheduled rate value is there the network resources are protected whenever the source transmit rate, according to rule 6 of the ABR specification, is stepwise forced to decrease. This is done when the number of backward resource management cells is substantially low compared to the number of forward resource management cells received by the policing device. This may occur for instance if a network failure prevents resource management cells to return.

The already mentioned *ATM Forum Specification* allows sources or virtual sources to transmit forward resource management cells which do not conform to the actual policing rate. Such cells have to be marked as out-of-rate cells via one of the bits, the so called CLP (Cell Loss Priority)-bit, and are allowed to be sent only at rates below TCR, the tagged cell rate. More particularly, rule 11 of the source behaviour on page 52 of the Specification is to be considered. The present policing method includes a step to check the conformance of these out-of-rate cells so that the network will not get flooded by out-of-rate cells.

A further feature of the present policing method is where the determined actual policing rate is executed at arrival time of each in-rate cell at the policing device.

Indeed, the implementation of the method currently proposed in the *ATM Forum Specification* is problematic because memory requirements of algorithm A based DGCRA, well known in the art, cannot be estimated properly and the real-time based update mechanism of algorithm B, also well known by persons working in the field of ABR, is hard to realise. When not determining the actual policing rate real-time but at each cell arrival, the complexity of implementation reduces significantly for algorithm B.

Yet another feature of the policing method according to the present invention is where the method further includes a step of: checking cell sequence integrity each time a forward in-rate cell arrives at the policing device by counting the number of data cells between two successive forward resource management cells, and by counting the number of forward resource management cells between two backward resource management cells.

Thus, if a source sends too much ATM data cells between two successive forward resource management cells, sends insufficiently frequent resource management cells, or transmits much more resource management cells than it receives backward resource management cells, cells will be discarded by the policing device. In this way, the policing device also checks rules 3a), b) and c) of the cited Specification.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
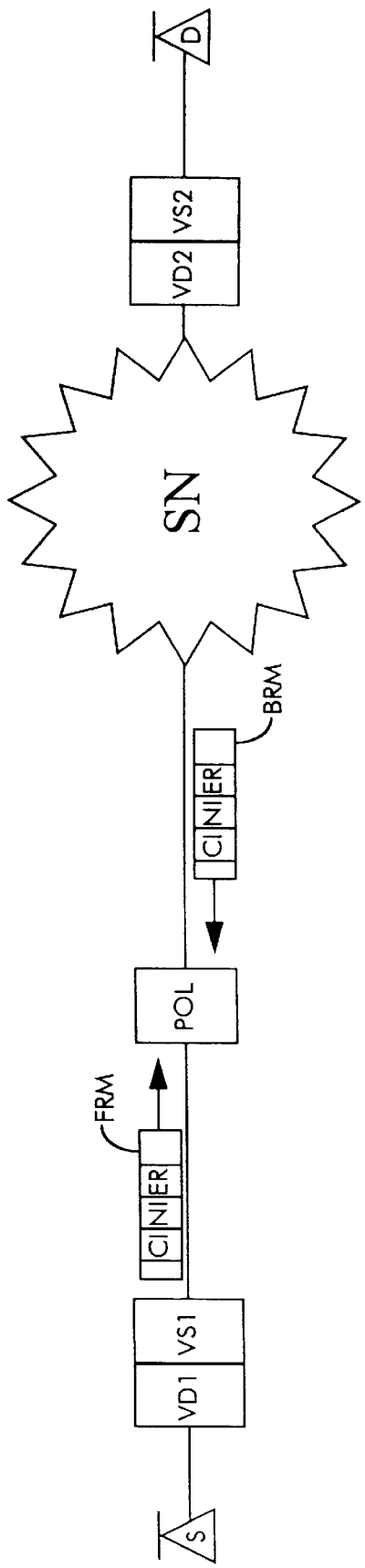
FIG. 1 shows a cell switching network including a policing device POL which executes the policing method according to the present invention.

In the following paragraphs, an implementation of the present policing algorithm in a cell switching network which supports the ATM (Asynchronous Transfer Mode) service class ABR (Available Bit Rate) will be disclosed in detail. First, the ABR (Available Bit Rate) service class is briefly described. Additionally, referring to FIG. 1, the architecture of the cell switching network wherein the policing method is applied will be discussed and afterwards, the policing method executed by the policing device POL in FIG. 1 will be explained in detail.

Before introducing the ABR (Available Bit Rate) service class, a list of abbreviations and parameter names that are used throughout the following description is given:

ATM: Asynchronous Transfer Mode;
ABR: Available Bit Rate;
RM: resource management cell;
FRM: forward resource management cell;
BRM: backward resource management cell;
CLP: Cell Loss Priority bit;
CI: Congestion Indication bit;
NI: No Increase bit;
ER: Explicit Rate;
MCR: Minimum Cell Rate;
PCR: Peak Cell Rate;
ICR: Initial Cell Rate;
TCR: Tagged Cell Rate;
RIF: Rate Increase Factor;
RDF: Rate Decrease Factor;
CDF: Cut off Decrease Factor;
R_real: parameter used to determine the rate that will be scheduled, named the 'rate schedule parameter' in the following paragraphs;
R_first: first scheduled rate value;
R_last: second scheduled rate value;
T_first: first scheduled time value;
T_last: second scheduled time value;
T_cell: arrival time of a cell;
Tb: arrival time of a backward RM cell;
Tb_last: arrival time of last backward RM cell;
Ta: arrival time of an in-rate cell;
Ta_last: arrival time of last in-rate cell;
Tf: arrival time of a forward RM cell;
Tf_last: arrival time of lost forward RM cell;
To: arrival time of an out-of-rate FRM cell;
Scheduled: Boolean parameter that indicates whether the list of scheduled rate values is empty or not;
Ccount: counter which keeps track of the number of in-rate FRM cells received by the policing device since the last received BRM cell;
Ncount: counter which keeps track of the number of in-rate cells received by the policing device since the last in-rate FRM cell;
Trm: Cell sequence time parameter;
Nrm: Cell sequence parameter which determines the amount of data cells to be transmitted by a source between two FRM cells;
Mrm: Cell sequence parameter which determines the minimum amount of data cells to be transmitted by a source between two FRM cells if the last FRM cell was sent at least Trm time ago;
CDVT or $\tau 1$: Cell delay variation tolerance;
T1: Denotes the time from a cell's transmission time by source S to its receipt at the interface in question, for instance the policer. So, T1 is the one-way transfer delay from an origin node to the policer;
T2: Denotes the sum of the delay from departure at the interface in question, i.e. the policer, of a backward RM cell on the backward connection to the receipt of the RM cell by the source, and the delay from the next transmission time of an in-rate cell on the connection to the arrival at the interface in question, i.e. the policer. So T2 is the round-trip feedback delay between an origin node and the policer, excluding the residual of the intercell interval between successive transmission times;
$\tau 2$: Denotes the upper bound on T2, as specified in the earlier cited *ATM Forum Specification*, paragraph 4.5.5, point 3, on page 34.
$\tau 3$: Denotes the lower bound on T2, as specified in the earlier cited *ATM Forum Specification*, paragraph 4.5.5, point 3, on page 34.
$T_{ICR}$: Time after which enforcement of the initial cell rate is allowed;
ADTF: Time permitted between sending RM cells before the rate is decreased to the initial cell rate ICR;
LVST: nominal arrival time of an in-rate cell assuming that a source sends equally spaced cells;
TAT_outrate: Theoretical arrival time of an out-of-rate cell, i.e. the nominal arrival time of the cell assuming that a source sends equally spaced out-of-rate cells;
CRM: limit number of FRM cells that may be sent in absence of BRM cells;

I: increment for in-rate cells;
Iold: previous value of I;
Ioutrate: increment of out-of-rate cells;
S: source;
VS: virtual source;
D: destination;
VD: virtual destination;
SN: switching node;
POL: policing device.

One of the service classes defined by the ATM Forum for transport of information over connections in an ATM network is ABR (Available Bit Rate). ABR exploits excess network bandwidth: bandwidth that is not used by deterministic service classes such as CBR (Continuous Bit Rate) or VBR (Variable Bit Rate), and has a closed loop feedback mechanism to report network congestion so that source nodes or terminals can reduce their transmission rate upon receipt of feedback information from the network. The ABR service is ideal for reliable transmission of bursty data, for instance LAN (Local Area Network) data. The ABR traffic contract made up between the subscriber and the network provider specifies a peak cell rate PCR that might not be exceeded by the subscriber, a minimum cell rate MCR that is always guaranteed by the provider, and some other parameters not immediately relevant with respect to the present invention, for example a maximum cell error ratio. An overview of the parameters characterising an ABR connection, a short description of the different ATM service classes defined by the ATM Forum, and further details with respect to the ABR service can be read in the article 'ABR: Realizing the Promise of ATM', written by N. Rickard and published in the magazine 'Telecommunications', Vol. 29, No. 4, April 1995.

FIG. 1 shows an ATM cell switching network which supports the ABR service. This ATM network includes a source S, a first virtual destination/virtual source node VD1/VS1, a policer POL, a switching node SN, a second virtual destination/virtual source node VD2/VS2, and a destination node D. Via the first virtual destination/virtual source node VD1/VS1 and the policer POL, the source S is coupled to the switching node SN. The policer POL is located at the network interface, not drawn in FIG. 1. In addition, the switching node SN is coupled to the destination node D via the second virtual destination/virtual source node VD2/VS2.

In the following, an ABR connection between the source node S and destination node D will be considered. Source node S transmits ATM cells to destination node D regularly intercepted by forward resource management cells FRM. The contents of these forward resource management cells FRM may be modified by the nodes along the path to the destination node D, i.e. by the first virtual destination/virtual source node VD1/VS1, by the switching node SN, by the second virtual destination/virtual source node VD2/VS2 or by the destination node D itself. These nodes are also capable of reflecting the resource management cells FRM. Once reflected, a forward resource management cell FRM becomes a backward resource management cell BRM which travels back to the source S to allow the source S to control its cell transmit rate. Also in the backward direction, the nodes along the path may modify the contents of the resource management cells. A resource management cell, FRM or BRM, contains bit information (a Congestion Indication bit CI and a No Increase bit NI), and explicit rate information ER. The source S has to decrease its transmit rate if the Congestion Indication bit CI in a backward resource management cell BRM is set, is no longer allowed to increase its transmit rate if the No Increase bit NI is set, and can increase its transmit rate if both the Congestion Indication bit CI and No Increase bit NI are not set. The source S further is not allowed to exceed the explicit rate value ER in backward resource management cells BRM with its transmit rate. These and other rules which determine the ABR source behaviour are stated in paragraph 5.10.4 of the 'ATM Forum Traffic Management Specification Version 4', already cited in the introductory part of this document. The virtual destination/virtual source nodes, VD1/VS1 and VD2/VS2, segment the feedback loop by reflecting forward resource management cells at their virtual destination side, VD1 or VD2, and inserting new forward resource management cells at their virtual source side, VS1 or VS2. To protect the switching node SN for buffer overflow or the network for congestion, the policer POL checks for each incoming cell whether this cell conforms to the traffic specifications in the contract. Non-conforming cells are discarded. Obviously, network protection is optimal when the policer POL realises the tightest conformance conditions with respect to the rules that define the ABR source behaviour. The next paragraphs are used to explain the policing algorithm executed by the policer POL of FIG. 1. This policer POL is supposed to be aware of the traffic descriptor values negotiated for the connection between the source S and destination D.

The flow charts in FIG. 2 to FIG. 7 are built up with different shaped boxes interconnected via horizontal as well as vertical lines. Via the lines a unique tree of successive steps is obtained. The branches of this tree are walked through from top to bottom and from left side to right side of the chart. The actions which have to be executed successively are represented by rectangle boxes. If the left and right side of such a rectangle box are drawn double, this box represents a procedure or cluster of actions. The actions included in this cluster are all connected to the bottom of the rectangle box with double left and right sides, and sometimes are drawn in separate figures to avoid overloading the charts. Each diamond shaped box indicates that one of two actions has to be executed. If a predetermined condition is fulfilled, the action or branch of actions connected to the diamond side marked by 'Y' is executed. If this predetermined condition is not fulfilled, the action or branch of actions connected to the 'N' marked side of the diamond box is executed. The predetermined condition itself is described within the diamond shaped box. An empty box indicates that no action has to be taken.

Figure 2:
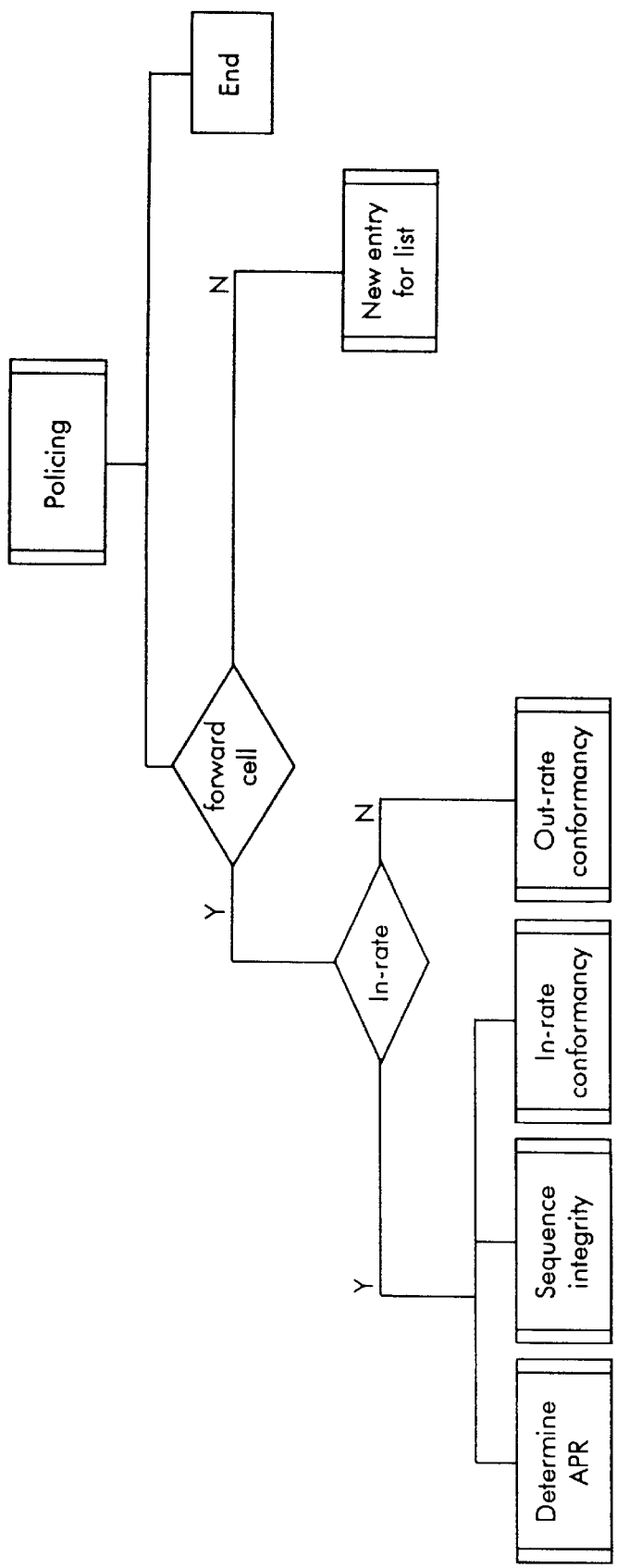
FIG. 2 is a flow chart of an implementation of the policing method according to the present invention.

FIG. 2 gives an overview of the policing method. Cells are treated differently depending on the direction wherein they are moving and depending on the status of their CLP bit. This CLP bit is set only for out-of-rate cells: cells which do not conform to the actual policing rate APR, or more precisely: cells which do not conform to the first three rules of the source behaviour specified in the ATM Forum Specification. The policer first checks whether an incoming cell is a forward moving cell, i.e. a cell which travels in the direction from the source S to the destination D, or a backward moving cell, i.e. a cell which travels in the direction from the destination D to the source S. It is to be remarked that the source S and destination D may change roles depending on the connection between them that is considered. Considering a connection between S and D wherein data cells, intercepted by resource management cells, are transmitted from S to D and wherein only resource management cells are routed from D to S, S plays the role of source and D of destination node. Backward moving cells are reflected forward resource management cells, in-rate or out-of-rate, and have to be analysed by the policer POL since they contain the information to control the source's cell transmit rate. From the contents of the backward resource management cells BRM, the policer POL calculates a scheduled rate value in the procedure 'New Entry for List'. This value will be used to determine the actual policing rate APR a scheduled time after the backward resource management cell BRM has been sent from the policer POL to the source S. The scheduled time as well as the associated scheduled rate value are memorised by the policer POL in a scheduled rate list. If a forward moving cell arrives at the policer POL, the policer POL has to decide whether the cell conforms to the traffic descriptors of the traffic contract and the source behaviour rules defined in the earlier cited Specification. If the cell is marked as an in-rate cell (CLP bit is not set), the policer POL determines the actual policing rate APR from the values stored in the scheduled rate list via the procedure 'Determine APR', checks whether the cell is in accordance with the cell sequence rules 3a, 3b and 3c of the above mentioned Specification in the procedure 'Sequence Integrity', and decides that the cell conforms to the actual policing rate APR or not in the procedure entitled 'In-rate Conformancy'. If the cell is marked as an out-of-rate cell (CLP-bit is set), its conformance also has to be checked as is stated in rule 11 of the Specification. FIG. 2 thereto includes the procedure 'Out-rate Conformancy'. Summarising, the method illustrated by FIG. 2 is executed for each cell arriving at the policer POL of FIG. 1 but the procedures that are executed depend on the nature of the arriving cell.

Figure 3:
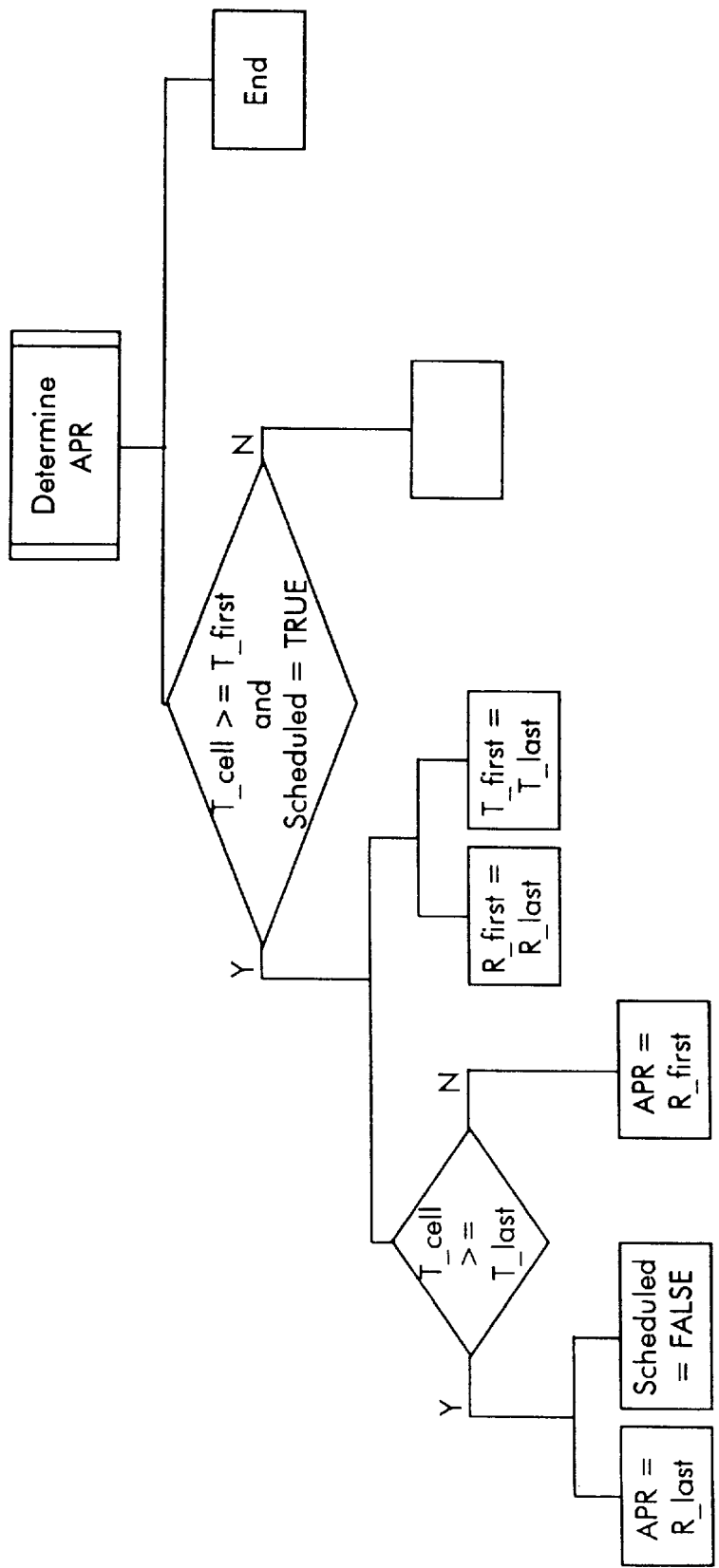
FIG. 3 is a flow chart of a procedure to determine the actual policing rate APR in the implementation illustrated by FIG. 2.
Figure 4:
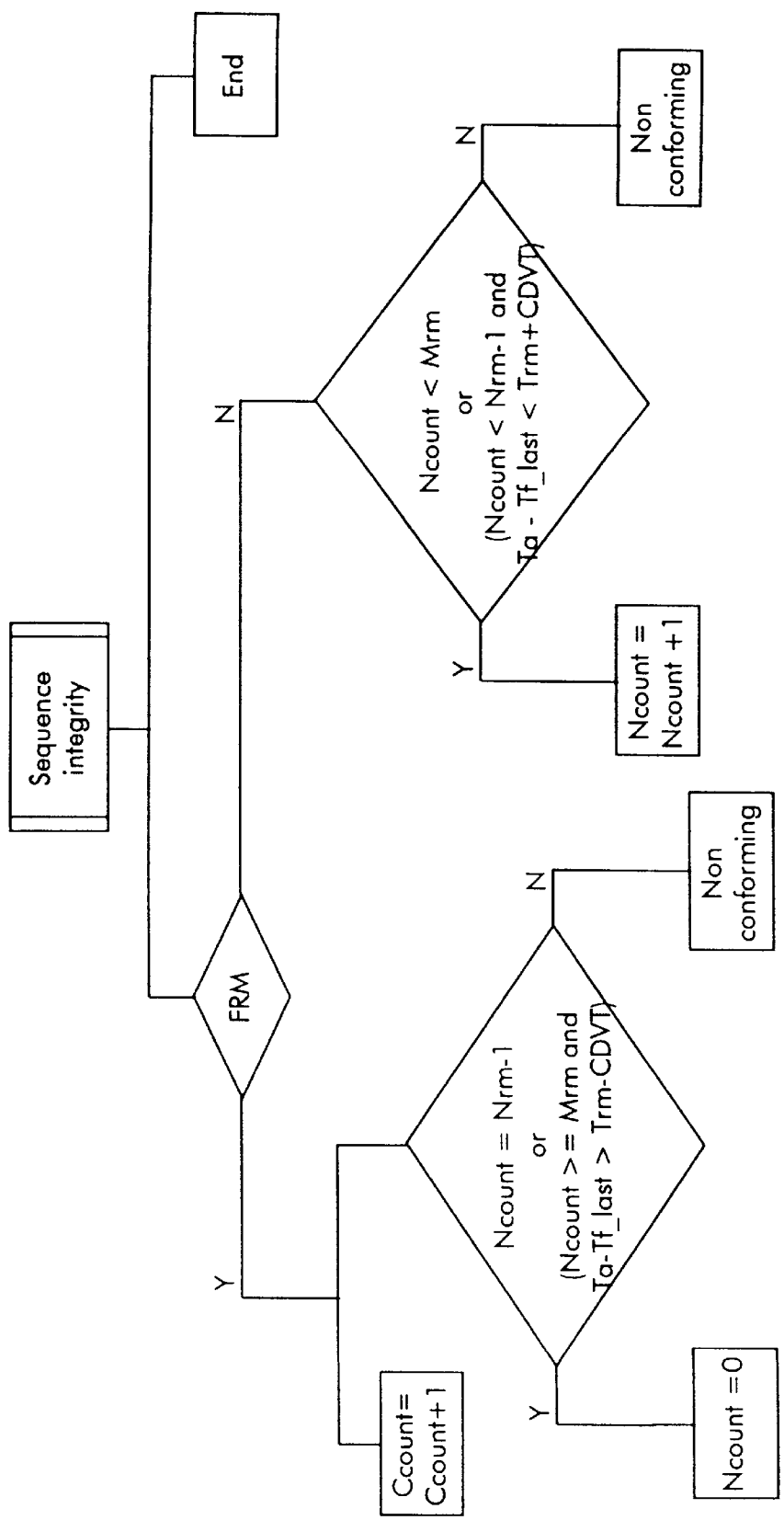
FIG. 4 is a flow chart of a procedure to check cell sequence integrity in the implementation illustrated by FIG. 2.
Figure 5A:
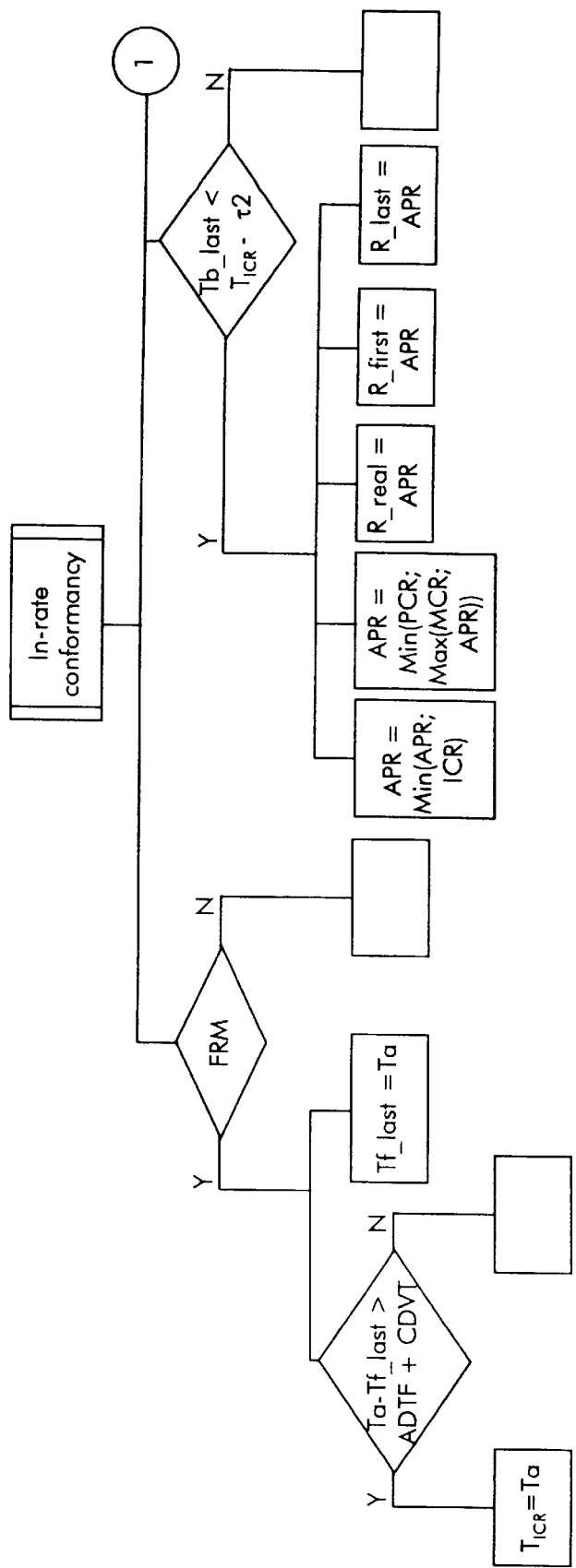
FIG. 5A, FIG. 5B and FIG. 5C constitute one flow chart of a procedure to check conformance of in-rate cells in the implementation illustrated by FIG. 2.
Figure 5B:
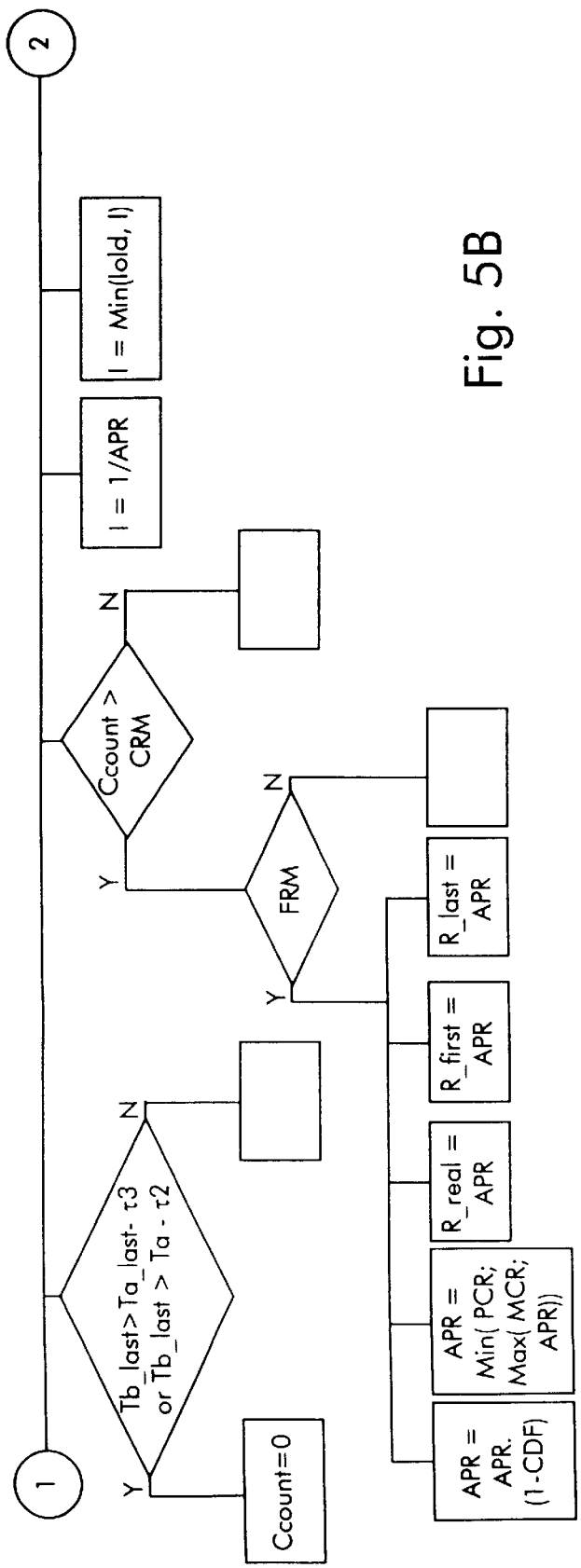
Figure 5C:
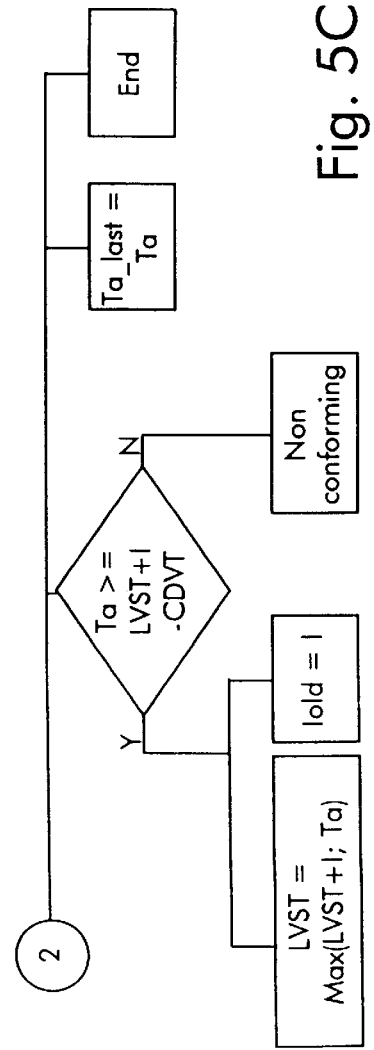

At arrival at the policer POL of each in-rate cell, the policer POL has to consult its scheduled rate list to determine the actual policing rate APR. This actual policing rate APR is to be known by the policer POL to be able to check conformance of the received in-rate cell. The procedure to determine the actual policing rate APR in case the scheduled rate list includes at most two scheduled rate values and related scheduled time values, is illustrated by FIG. 3. The arrival time T_cell of the cell at the policer POL is compared with the scheduled time values, T_first and T_last, in the scheduled rate list to deduce the correct actual policing rate APR. If the arrival time T_cell of the in-rate cell is below the earliest scheduled time value T_first, the actual policing rate APR remains unchanged. If the arrival time T_cell equals or exceeds the earliest scheduled time value T_first, the actual policing rate APR becomes equal to either the first scheduled rate value R_first or last scheduled rate value R_last. If in this case the in-rate cell arrived at the policer POL at a time T_cell which exceeds the last scheduled time value T_last, the actual policing rate APR becomes the last scheduled rate value R_last. Otherwise, APR becomes equal to the first scheduled rate value R_first. In case the actual policing rate APR becomes equal to the last scheduled rate value R_last, the list of scheduled rate values is unscheduled. This is realised by the Boolean parameter 'Scheduled' which is given the value 0 or 'FALSE' in the present software implementation. Obviously, the policer POL checks whether the 'Scheduled'-parameter is 1 or 'TRUE' each time an in-rate cell arrives before starting to determine APR. If the policer POL recognises that no rate values are scheduled, the actual policing rate APR remains unchanged. The scheduled rate list is updated by replacing the oldest entry, T_first and R_first, by the more recent entry, T_last and R_last. For evident reasons, this step is executed only if the in-rate cell arrived at a time T_cell which equals or exceeds the first scheduled time value T_first. Otherwise, the scheduled rate list remains unchanged.

*Source behaviour* rule 3a on page 52 of the earlier mentioned *Specification* states that Nrm-1 data cells have to be sent between two successive in-rate forward resource management cells. If however a time period Trm has elapsed since transmission of the last FRM cell and at least Mrm in-rate cells have been sent by the source S, Mrm being a predetermined number smaller than Nrm, the above statement may be violated and a new forward RM cell should be sent by source S. The number of data cells between two successive in-rate forward RM cells is counted via the counter Ncount. As is seen from FIG. 4, this counter Ncount is increased each time a cell is received by the policer POL except when the cell is a forward resource management cell FRM or not conform with rule 3a. In the case where the arriving cell is a forward resource management cell FRM, Ncount is reset to 0 unless the FRM cell is violating the cell sequence rules. The counter Ncount is initialised to Nrm-1 at start-up of the connection between the source S and destination D since the first transmitted cell of a source S, to be in accordance with rule 2 of the ABR Specification, has to be an FRM cell. If, in view of rule 3a, the arriving cell is not conforming, cell sequence integrity is violated and the cell becomes discarded by the policer POL. It is to be noticed that to check the conformance with rule 3a, more particularly when comparing the time Ta−Tf_last which has past since arrival of the last forward RM cell with Trm, the cell delay variation tolerance CDVT has to be taken into account to give the source S the benefit of the doubt.

To avoid flooding of the network with forward cells, rule 6 of the ABR source behaviour specification states that the cell transmit rate of the source S has to decrease when at least CRM in-rate forward RM cells have been sent between receipt of two successive backward RM cells. Thereto, a counter Ccount is increased by 1 in FIG. 4 each time an in-rate forward RM cell arrives. The value of this counter Ccount will be checked for in other procedures.

Each in-rate cell further has to be checked to be conform with the traffic descriptors of the contract and the remaining rules of the ABR source behaviour. To check the conformance of in-rate cells, FIG. 5A, FIG. 5B and FIG. 5C constitute the procedure to be executed. If the time permitted between sending forward resource management cells, ADTF, is exceeded, taking into account the cell delay variation tolerance CDVT, the rate is forced to the initial cell rate ICR. This is realised by modifying the time value $T_{ICR}$ to be equal to the arrival time Ta of the forward RM cell if the time between receipt of this forward RM cell and receipt of the last forward RM cell, Ta−Tf_last, exceeds the allowed time period ADTF+CDVT. The time of arrival Ta of the cell at the policer POL is memorised as the arrival time Tf_last of the last forward RM cell for each forward RM cell arriving. From the time $T_{ICR}$ on, the policer POL is allowed to force the source S to the initial cell rate ICR. To be sure that it is permitted to enforce the initial cell rate ICR, the policer POL checks whether the source S received the information which allowed the source S to reduce its transmit rate in time. If the last backward RM cell passed the policer POL at a time Tb_last at least τ2 earlier then $T_{ICR}$, the source S received the information in time and was able to reduce its cell transmit rate at $T_{ICR}$ to the initial cell rate ICR. In this case, the actual policing rate APR is reduced to the minimum one of the initial cell rate ICR and the former value of APR, provided that this minimum stays between the minimum cell rate MCR and peak cell rate PCR negotiated in the traffic contract. The parameter R_real and the entries in the scheduled rate list, R_first and R_last, are updated. If the last backward RM cell passed the policer POL later, APR is left unmodified because it is possible then that the source S does not decrease its rate to ICR in time. Ccount, the counter parameter for forward RM cells between two successive backward RM cells is initialised to 0 if the arrival time of the lost backward RM cell exceeds the arrival time of the last cell Ta_last minus τ3 or the arrival time of the currently arriving cell Ta minus τ2. Indeed, Ccount is the counter equivalent to the counter which counts the number of transmitted FRM cells between two received BRM cells in the source S. The policer POL is allowed to increase Ccount only when he knows that the arrived forward RM cell was transmitted after receipt of the last backward RM cell by the source, i.e. when Ta>=Tb_last+τ2. Otherwise, i.e. when Ta<Tb_last+τ2, the counter Ccount has to be reset to zero. If however the backward RM cells arrive at the policer POL at instants between Ta_last and Ta−τ2, the counter Ccount is never reset although a backward cell is received for each forward cell. For this reason, the second condition, Tb_last>Ta_last−τ3, is also checked for. The value of Ccount in addition is compared to CRM. If Ccount is greater than CRM and a new forward RM cell arrives, source rule 6 states that the actual policing rate APR has to decrease with a step equal to APR.CDF, CDF being the cut-off decrease factor. Of course, APR may not become a value outside the range defined by the negotiated minimum cell rate MCR and peak cell rate PCR, so this has to be checked after APR is decreased. If the actual policing rate APR is changed in value, the parameter R_real and the scheduled rate values, R_first and R_last, are also updated.

The increase I which determines the theoretical arrival time of a cell is the minimum of a former increase value Iold and the inverse of the actual policing rate APR. If the cell arrived at a time Ta which is greater than or equal to the arrival time of the previous in-rate cell LVST, increased with the increment I, the cell conforms. It is noticed that the tolerance CDVT has to be taken into account when checking the just mentioned condition. The arrival time of the previous in-rate cell, LVST, is updated and becomes the maximum of the expected arrival time of a new cell, i.e. LVST+I, and the arrival time Ta which may be below LVST+I because of the tolerance CDVT that has to be taken into account, or which may be above LVST+I if the source does not transmit at its maximum allowable rote. Doing so, it is avoided that a source S which temporarily transmits below its allowed maximum rate, later on transmits at a rate above the maximum allowed rate. Capacity given to a source S cannot be saved up by this source S. The procedure 'In-rate conformancy' is terminated when the arrival time Ta is memorised as the arrival time of the last in-rate cell, Ta_last.

Figure 6A:
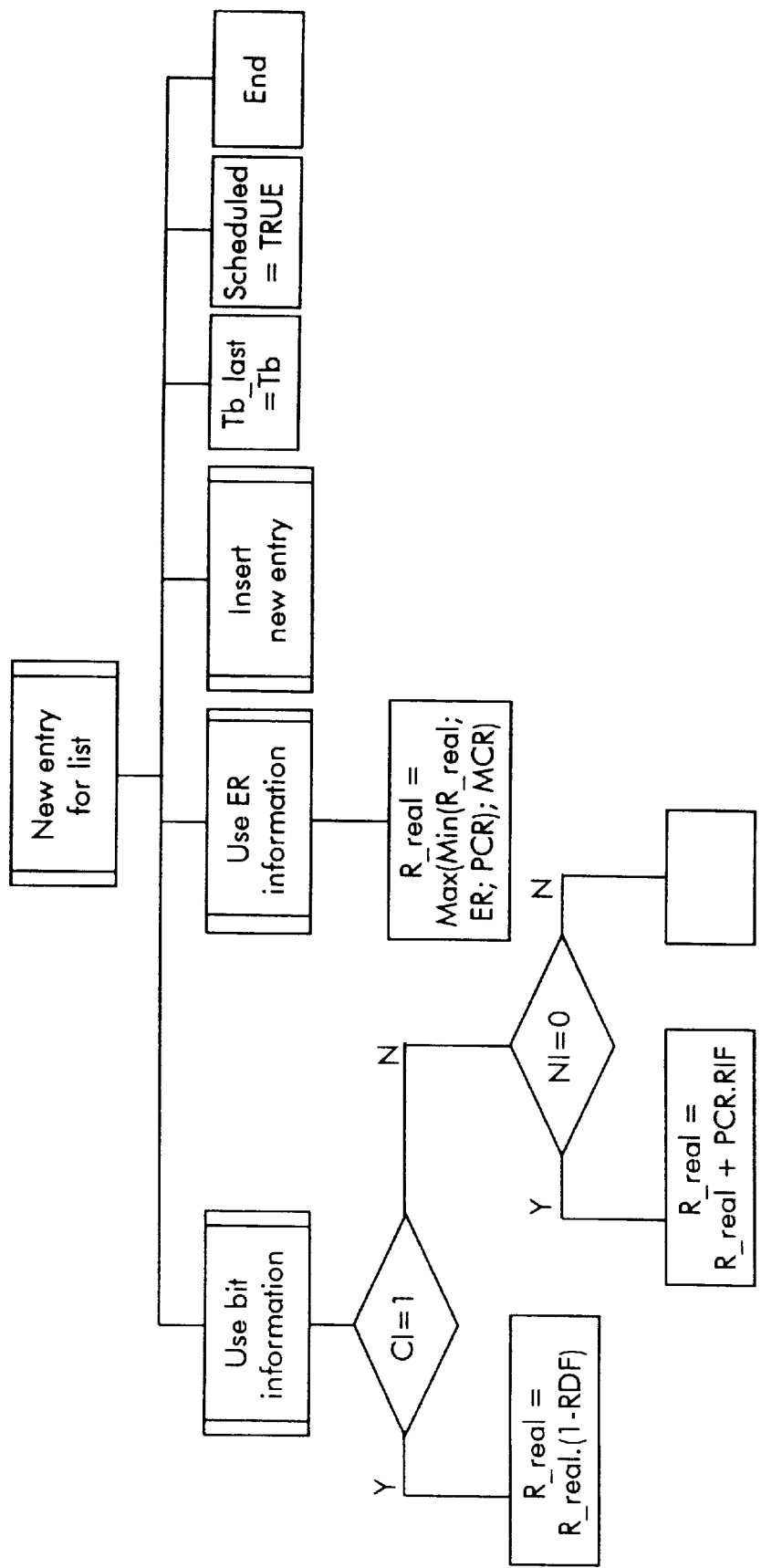
FIG. 6A is a flow chart of a procedure to add a new entry to a list of scheduled rate values in the implementation illustrated by FIG. 2.
Figure 6B:
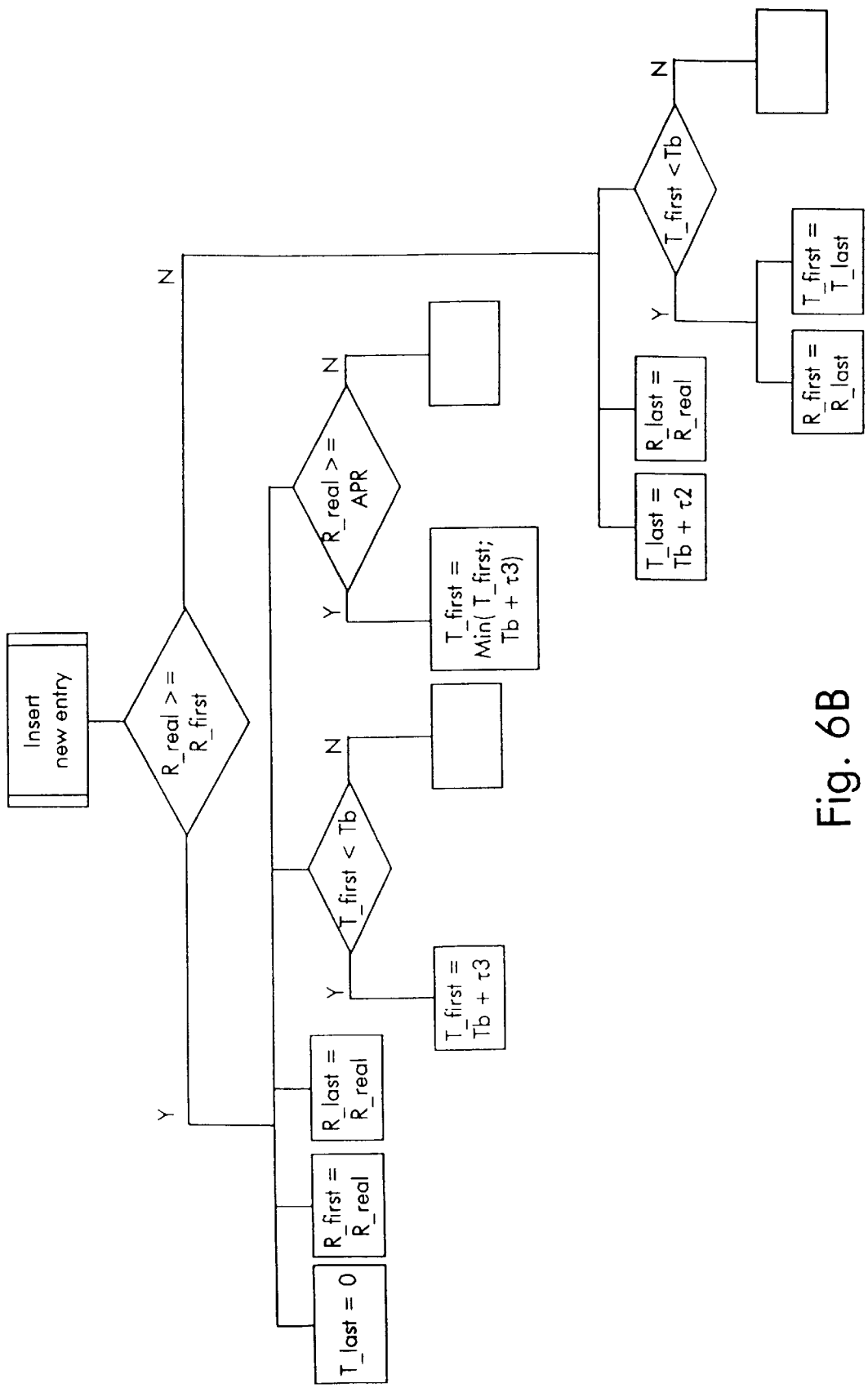
FIG. 6B represents a flow chart of a procedure to insert a new entry in the list of scheduled rate values, which is used in the procedure illustrated by FIG. 6A.

When the cell received by the policer POL in FIG. 1 is a backward resource management cell BRM, the information contained by this cell has to be used to determine a new scheduled rate and scheduled time value. FIG. 6A and FIG. 6B illustrate the successive steps that have to be executed thereto. As specified in rule 8 of the ABR source behaviour definition on page 52 of the already mentioned Specification, the cell transmit rate of the source S has to be reduced by at least a term proportional to the cell transmit rate if the Congestion Indication bit CI of the received backward RM cell is set. In the present algorithm, rate schedule parameter R_real is decreased with an amount R_real.RDF in this situation. Herein, RDF represents the rate decrease factor which determines the proportionality between the decrease step and the cell transmit rate. As will be explained later on, the rate schedule parameter R_real will be used to determine the scheduled rate values, R_first and/or R_last. The reduction of the value of R_real will lead to an equivalent reduction of the scheduled rate value so that rule 8 has to be satisfied by the source S when the Congestion Indication bit CI is set, unless cells may be discarded by the policer POL. If the Congestion Indication bit is not set and also the No Increase bit NI is not set, the cell transmit rate of the source S is allowed to increase with a term proportional to the peak cell rate PCR. The proportionality is defined by the rate increase factor RIF. As is seen from FIG. 6A, the rate schedule parameter R_real, in case none of the Congestion Indication bit CI or No Increase bit NI is set, is increased with an amount PCR.RIF. The scheduled rate value, R_first and/or R_last, similarly to the above situation, will increase in an equivalent way. If only the No Increase bit NI is set, the actual policing rate APR does not have to be changed. Since the source S is not allowed to increase its cell transmit rate in this case, R_real is left unmodified.

The backward RM cell not only contains bit information but also carries an explicit rate value ER which, according to rule 9 of the ABR source behaviour specifications, might not be exceeded by the cell transmit rate of the source S. In addition, rule 1 forbids the source S to transmit at rates above the negotiated peak cell rate PCR of the traffic contract. Hence, the policing rate at any time has to be the minimum one of the peak cell rate PCR, the received explicit rate value ER and the rate value R_real calculated from the bit information in the backward RM cell. This minimum one moreover has to be greater than the negotiated minimum cell rate MCR. Since this minimum cell rate MCR is guaranteed at any time to the source S, the scheduled rate value, R_first and/or R_last, becomes equal to this minimum cell rate MCR if the latter is untrue. The so calculated rate value R_real is memorised together with an associated time value in the scheduled rate list of the policer POL. The time value represents the moment from which the policer POL has to use the associated rate value to determine its actual policing rate APR and obviously may depend on the distance between policer POL and source S. This distance is unimportant for a rate increase but has to be considered for rate decreases. The rate value and associated time value constitute a new entry for the scheduled rate list. How this entry is inserted in the scheduled rate list will be explained immediately by referring to FIG. 6B. The policer POL, as follows from FIG. 6A, also memorises the arrival time Tb of the just received and interpreted backward RM cell and indicates via its parameter 'Scheduled' that a new entry became scheduled.

FIG. 6B illustrates the procedure to insert a new entry in the list of scheduled rate values. If the scheduled rate parameter R_real is greater than or equal to the current first scheduled rate R_first, this rate R_first is unscheduled by initialising T_last to 0 and updating the scheduled rates, R_first and R_last so that they become equal to the higher rate R_real. Additionally, the associated time T_first for the new higher rate is scheduled. T_first becomes equal to the arrival time Tb of the backward RM cell at the policer POL extended with τ3. If however the arrival time Tb of the backward RM cell is below the first scheduled time T_first, T_first is left unmodified. T_first becomes equal to the extended arrival time Tb+τ3 if this extended arrival time Tb+τ3 is smaller than T_first and if the calculated rate value R_real is equal to or greater than the actual policing rate APR.

If the value R_real is smaller than the current first scheduled rate R_first, the last scheduled entry, T_last and R_last, is updated to contain the new time and rate values Tb+τ2 and R_real respectively.

The arrival time Tb of the backward RM cell is memorised as the arrival time Tb_last of the last backward RM cell, and the boolean parameter 'Scheduled' is given the value TRUE or 1.

Figure 7:
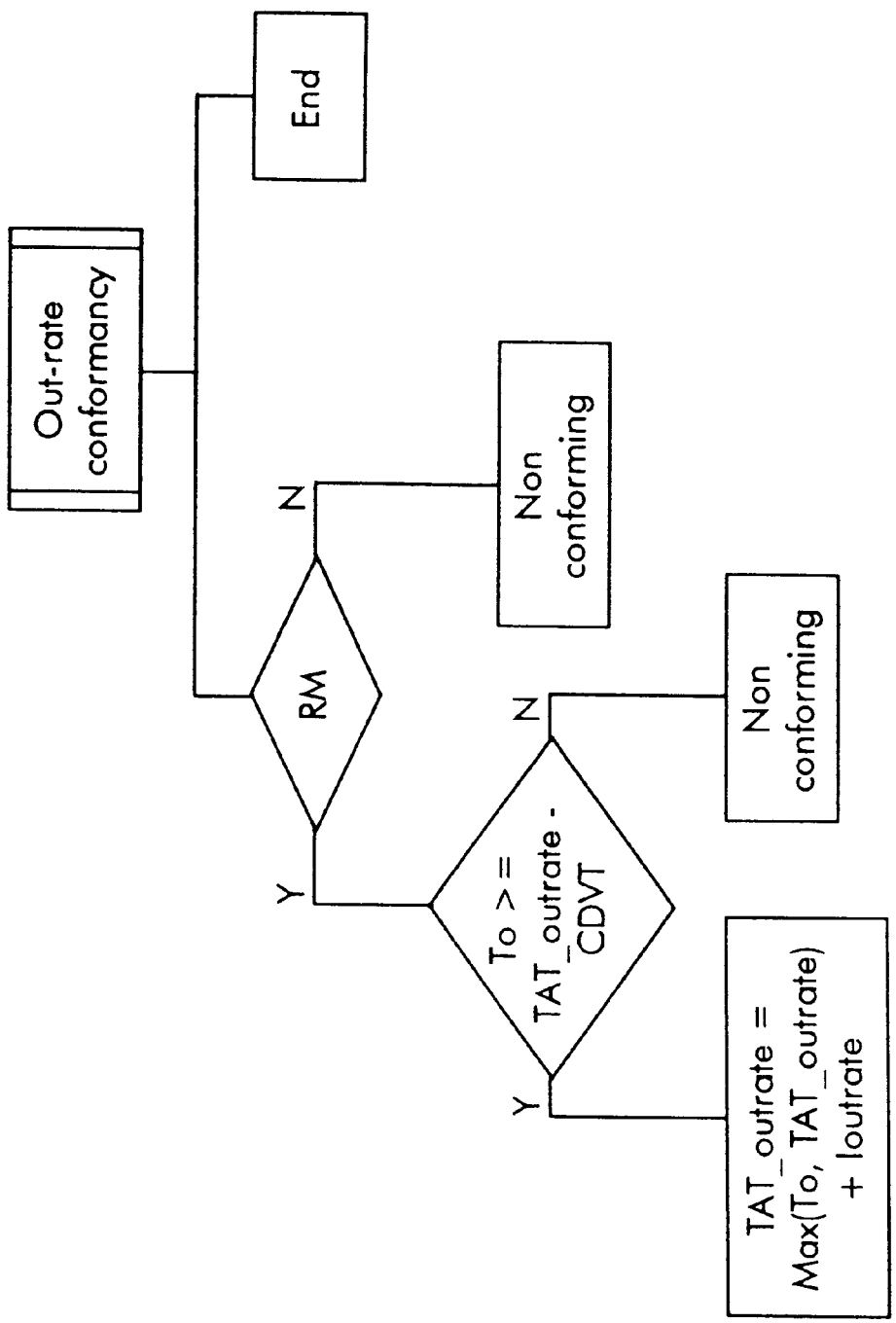
FIG. 7 is a flow chart of a procedure to check conformance of out-of-rate cells in the implementation illustrated by FIG. 2.

Out-of-rate cells have to be sent conform with rule 11 of the ABR source behaviour specification. Such out-of-rate cells do not have to be sent at a rate below the actual policing rate APR but have to respect a maximum out-of-rate cell rate, TCR, named the tagged cell rate. According to the ABR Standard Specification, TCR is a fixed constant of 10 cells per second. The procedure to check out-of-rate conformance, illustrated by FIG. 7 is thus less complex than the 'In-rate conformancy' procedure. Only resource management cells RM are accepted as out-of-rate cells. If such a resource management cell with CLP bit equal to 1 arrives after the theoretical arrival time of the next out-of-rate cell TAT_outrate minus the tolerance CDVT on the transmission time from source S to policer POL, the cell is accepted. Otherwise, the cell does not conform with rule 11 and is discarded. To calculate the theoretical arrival time of the next out-of-rate cell_TAT outrate, the maximum one of the arrival time To of the last out-of-rate cell and the present value of TAT_outrate has to be increased with a step Ioutrate, e.g. equal to 0.1 second. In this way, it is avoided that out-of-rate cells are sent at a rate higher than TCR if, during a certain time, no out-of-rate cells were sent. In other words, a source S cannot save up out-of-rate capacity by not transmitting out-of-rate cells during a period of time. The step Ioutrate obviously is initialised to the inverse of TCR.

It is to be remarked that although the list of scheduled rate values in the above described embodiment is limited to two entries, application of the present invention is not limited thereto. For the ABR (Available Bit Rate) class, the ATM Forum proposes 2 policing methods, known as the DGCRA A and the DGCRA B algorithms. The A algorithm differs from the B algorithm in that its list of scheduled rate values is not limited to a predetermined number of entries. Algorithm B manages a list containing at most 2 scheduled rate values. The use of information deduced at arrival of a forward resource management cell at the policer to determine a scheduled rate value, is independent from the fact that the list contains 1, 2 or more entries. Hence, it will be apparently obvious to anyone skilled in the field of traffic management in telecommunication networks that applicability of the present invention is not restricted by the size of the list of scheduled rate values.

It is further remarked that the procedures described in the above sample algorithm, should not be considered as limiting the scope of the invention. The procedure 'Sequence Integrity' for instance is not required to realise the object of the present invention and consequently not necessarily has to be executed. In an alternative embodiment of the present invention, RM cells may be sent out of sequence with respect to the data cells, whilst sequence integrity within the RM cell stream is maintained.

It should also be noted that the present invention does not have to be implemented in an ABR (Available Bit Rate) environment. Data of any other class, e.g. the VBR+ class briefly discussed in the earlier cited article *'ABR: Realizing the Promise of ATM'*, which supports feedback of resource management cells to allow sources to control their cell transmit rates, may be policed in accordance to the present algorithm.

While the principles of the invention have been described above in connection with specific apparatus, it is to be clearly understood that this description is made only by way of example and not as a limitation on the scope of the invention.

What is claimed is:

1. A method to determine in a policing device (POL) a scheduled rate value (R_first, R_last) to be used at an associated scheduled time (T_first, T_last) on said policing device (POL) to police cell traffic in a connection between an origin node (S, VS1) and a destination node (D, VD2) of a cell switching network, wherein a cell transmission rate of said origin node (S, VS1) is controlled by said origin node (S, VS1) upon receipt and interpretation of rate control information (CI, NI, ER) contained in a backward resource management cell (BRM) that is backward routed via said policing device (POL) towards said origin node (S, VS1), said method comprising the step of calculating said scheduled rate value (R_first, R_last) from said rate control information (CI, NI, ER) in said backward resource management cell (BRM), and from information deduced from a forward resource management cell (FRM), said forward resource management cell (FRM) being generated by said origin node (S, VS1) and routed forward towards said destination node (D, VD2) via said policing device (POL), characterized in that said information deduced from said forward resource management cell (FRM) indicates that said cell transmission rate has to decrease to an initial cell rate (ICR) if a certain time period has elapsed between receipt of said forward resource management cell (FRM) and a previous forward resource management cell.

2. A policing method for cell traffic in a connection between an origin node (S, VS1) and a destination node (D, VD2) of a cell switching network, wherein a cell transmission rate of said origin node (S, VS1) is controlled by said origin node (S, VS1) upon receipt and interpretation of rate control information (CI, NI, ER) contained in a backward resource management cell (BRM) backward routed via a policing device (POL) which executes said policing method towards said origin node (S, VS1), said policing method including the steps of:

a. determining a scheduled rate value (R_first, R_last) and a related scheduled time value (T_first, T_last) each time a backward resource management cell (BRM) arrives at said policing device (POL) from rate control information (CI, NI, ER) in said backward resource management cell (BRM), and from information deduced from a forward resource management cell (FRM), said forward resource management cell (FRM) being generated by said origin node (S, VS1) and routed forward towards said destination node (D, VD2) via said policing device (POL);

b. memorizing said scheduled rate value (R_first, R_last) and the related scheduled time value (T_first, T_last) in a list of scheduled rate values;

c. determining from information memorized in said list of scheduled rate values an actual policing rate (APR); and d. checking conformance of each in-rate cell arriving at said policing device (POL) with respect to said actual policing rate (APR), characterized in that in said step (a), said information deduced from said forward resource management cell (FRM) indicates that said cell transmission rate has to decrease to an initial cell rate (ICR) if a certain time period has elapsed between receipt of said forward resource management cell (FRM) and a previous forward resource management cell.

3. A policing method according to claim 2, characterised in that said method further includes a step of:

f. checking cell sequence integrity each time a forward in-rate cell arrives at said policing device (POL) by counting the number of data cells between two successive forward resource management cells (FRM), and by counting the number of forward resource management cells (FRM) between two backward resource management cells (BRM).

4. A policing device (POL) adapted to police cell traffic in a connection between an origin node (S, VS1) and a destination node (D, VD2) of a cell switching network wherein a cell transmission rate of said origin node (S, VS1) is controlled by said origin node (S, VS1) upon receipt and interpretation of rate control information (CI, NI, ER) contained in a backward resource management cell (BRM) backward routed via a policing device (POL) which executes a policing method towards said origin node (S, VS1), said policing device (POL) including:

a. scheduled rate determining means for determining a scheduled rate value (R_first, R_last) and the related scheduled time value (T_first, T_last) each time a backward resource management cell (BRM) arrives at said policing device (POL) from rate control information (CI, NI, ER) in said backward resource management cell (BRM) and from information deduced from a forward resource management cell (FRM), said forward resource management cell (FRM) being generated by said origin node (S, VS1) and routed forward towards said destination node (D, VD2) via said policing device (POL);

b. memory means for storing said scheduled rate value (R_first, R_last) and the related scheduled time value (T_first, T_last) in a list of scheduled rate values;

c. calculating means for determining from information memorized in said list of scheduled rate values an actual policing rate (APR); and d. policing means for checking conformance of each in-rate cell arriving at said policing device (POL) with respect to said actual policing rate (APR), characterized in that said scheduled rate determining means are adapted to deduce from said forward resource management cell (FRM) information indicating that said cell transmission rate has to decrease to an initial cell rate (ICR) if a certain time period has elapsed between receipt of said forward resource management cell (FRM) and a previous forward resource management cell.

5. A method to determine in a policing device (POL) a scheduled rate value (R_first, R_last) to be used at an associated scheduled time (T_first, T_last) on said policing device (POL) to police cell traffic in a connection between an origin node (S, VS1) and a destination node (D, VD2) of a cell switching network wherein a cell transmission rate of said origin node (S, VS1) is controlled by said origin node (S, VS1) upon receipt and interpretation of rate control information (CI, NI, ER) contained in a backward resource management cell (BRM) that is backward routed via said policing device (POL) towards said origin node (S, VS1), said method comprising the step of calculating said scheduled rate value (R_first, R_last) from said rate control information (CI, NI, ER) in said backward resource management cell (BRM), and from information deduced from a forward resource management cell (FRM), said forward resource management cell (FRM) being generated by said origin node (S, VS1) and routed forward towards said destination node (D, VD2) via said policing device (POL), characterized in that said information deduced from said forward resource management cell (FRM) indicates that said cell transmission rate has to decrease with a predetermined rate decrease factor (RDF) if already a certain number of forward resource management cells have been received since a last backward resource management cell was received.

6. A policing method for cell traffic in a connection between an origin node (S, VS1) and a destination node (D, VD2) of a cell switching network wherein a cell transmission rate of said origin node (S, VS1) is controlled by said origin node (S, VS1) upon receipt and interpretation of rate control information (CI, NI, ER) contained in a backward resource management cell (BRM) backward routed via a policing device (POL) which executes said policing method towards said origin node (S, VS1), said policing method including the steps of:

a. determining a scheduled rate value (R_first, R_last) and a related scheduled time value (T_first, T_last) each time a backward resource management cell (BRM) arrives at said policing device (POL) from rate control information (CI, NI, ER) in said backward resource management cell (BRM), and from information deduced from a forward resource management cell (FRM), said forward resource management cell (FRM) being generated by said origin node (S, VS1) and routed forward towards said destination node (D, VD2) via said policing device (POL);

b. memorizing said scheduled rate value (R_first, R_last) and related scheduled time value (T_first, T_last) in a list of scheduled rate values;

c. determining from information memorized in said list of scheduled rate values an actual policing rate (APR); and d. checking conformance of each in-rate cell arriving at said policing device (POL) with respect to said actual policing rate (APR), characterised in that in said step (a), said information deduced from said forward resource management cell (FRM) indicates that said cell transmission rate has to decrease with a predetermined rate decrease factor (RDF) if already a certain number of forward resource management cells have been received since a last backward resource management cell was received.

7. A policing method according to claim 6, wherein said method further includes a step of:

f. checking cell sequence integrity each time a forward in-rate cell arrives at said policing device (POL) by counting the number of data cells between two successive forward resource management cells (FRM), and by counting the number of forward resource management cells (FRM) between two backward resource management cells (BRM).

8. A policing device (POL) adapted to police cell traffic in a connection between an origin node (S, VS1) and a destination node (D, VD2) of a cell switching network wherein a cell transmission rate of said origin node (S, VS1) is controlled by said origin node (S, VS1) upon receipt and interpretation of rate control information (CI, NI, ER) contained in a backward resource management cell (BRM) backward routed via a policing device (POL) which executes said policing method towards said origin node (S, VS1), said policing device (POL) including:

a. scheduled rate determining means for determining a scheduled rate value (R_first, R_last) and the related scheduled time value (T_first, T_last) each time a backward resource management cell (BRM) arrives at said policing device (POL) from rate control information (CI, NI, ER) in said backward resource management cell (BRM) and from information deduced from a forward resource management cell (FRM), said forward resource management cell (FRM) being generated by said origin node (S, VS1) and routed forward towards said destination node (D, VD2) via said policing device (POL);

b. memory means for storing said scheduled rate value (R_first, R_last) and the related scheduled time value (T_first, T_last) in a list of scheduled rate values;

c. calculating means for determining from information memorized in said list of scheduled rate values an actual policing rate (APR); and d. policing means for checking conformance of each in-rate cell arriving at said policing device (POL) with respect to said actual policing rate (APR), characterized in that said scheduled rate determining means are adapted to deduce from said forward resource management cell (FRM) information indicating that said cell transmission rate has to decrease with a predetermined rate decrease factor (RDF) if already a certain number of forward resource management cells have been received since a last backward resource management cell was received.

* * * * *